(12) United States Patent  
Salter

(10) Patent No.: US 9,902,320 B2  
(45) Date of Patent: Feb. 27, 2018

(54) PHOTOLUMINESCENT COLOR CHANGING DOME MAP LAMP

(71) Applicant: Ford Global Technologies, LLC, Dearborn, MI (US)

(72) Inventor: Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/519,221

(22) Filed: Oct. 21, 2014

(65) Prior Publication Data

US 2015/0197192 A1   Jul. 16, 2015

Related U.S. Application Data

(63) Continuation-in-part of application No. 14/301,635, filed on Jun. 11, 2014, now Pat. No. 9,499,096, which is a continuation-in-part of application No. 14/156,869, filed on Jan. 16, 2014, now Pat. No. 9,440,583, which is a continuation-in-part of application No. 14/086,442, filed on Nov. 21, 2013.

(51) Int. Cl.
| | |
|---|---|
| *F21V 11/00* | (2015.01) |
| *B60Q 3/80* | (2017.01) |
| *B60Q 3/74* | (2017.01) |
| *B60Q 3/68* | (2017.01) |

(52) U.S. Cl.  
CPC .............. *B60Q 3/80* (2017.02); *B60Q 3/68* (2017.02); *B60Q 3/74* (2017.02)

(58) Field of Classification Search  
CPC ..... B60Q 3/0279; B60Q 3/008; B60Q 3/0293  
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Elmito Breval  
*Assistant Examiner* — Meghan Ulanday  
(74) *Attorney, Agent, or Firm* — Vichit Chea; Price Heneveld LLP

(57) ABSTRACT

A lighting device for a vehicle is disclosed. The lighting device comprises at least one light source in communication with a controller. The light source is configured to emit a first emission to excite a photoluminescent portion. The controller is operable to adjust an output color of an emitted light from the lighting device by adjusting an intensity of light output from the at least one light source.

19 Claims, 5 Drawing Sheets

(56) References Cited

U.S. PATENT DOCUMENTS

| | | |
|---|---|---|
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,064,354 B2 | 6/2006 | Chen |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,737,623 B2 | 6/2010 | Kaneda |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,801,205 B2 | 8/2014 | Harbers et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0037376 A1* | 2/2011 | Van Herpen ......... H05B 33/145 313/483 |
| 2012/0001406 A1 | 1/2012 | Paxton et al. |
| 2012/0104954 A1* | 5/2012 | Huang ............... H05B 33/0851 315/158 |
| 2012/0183677 A1 | 7/2012 | Agrawal et al. |
| 2012/0280528 A1 | 11/2012 | Dellock et al. |
| 2013/0092965 A1 | 4/2013 | Kijima et al. |
| 2013/0320369 A1 | 12/2013 | Gartner et al. |
| 2013/0335994 A1 | 12/2013 | Mulder et al. |
| 2013/0343034 A1 | 12/2013 | Harbers et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0102819 A1 | 4/2016 | Misawa et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

PHOTOLUMINESCENT COLOR CHANGING DOME MAP LAMP

CROSS-REFERENCE TO RELATED APPLICATIONS

This application is a continuation-in-part of U.S. patent application Ser. No. 14/301,635, filed Jun. 11, 2014, and entitled "PHOTOLUMINESCENT VEHICLE READING LAMP," now U.S. Pat. No. 9,499,096, which is a continuation-in-part of U.S. patent application Ser. No. 14/156,869, filed on Jan. 16, 2014, entitled "VEHICLE DOME LIGHTING SYSTEM WITH PHOTOLUMINESCENT STRUCTURE," now U.S. Pat. No. 9,440,583, which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to lighting devices, and more particularly relates to a lighting device configured to adjust a color of an output light.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present invention, a lighting device for a vehicle is disclosed. The lighting device comprises at least one light source in communication with a controller. The light source is configured to emit a first emission to excite a photoluminescent portion. The controller is operable to adjust an output color of an emitted light from the light source by adjusting an intensity of light output from the at least one light source.

According to another aspect of the present invention, a lighting device for a vehicle is disclosed. The lighting device comprises a light source configured to emit a first emission. A photoluminescent portion is disposed proximate the light source and is configured to convert at least a portion of the first emission to a second emission. The lighting device further comprises a controller a controller configured to adjust a color of the second emission by selectively adjusting an intensity of the first emission.

According to yet another aspect of the present invention, a lighting device for a vehicle is disclosed. The lighting device comprises a light source in communication with a controller and configured to emit a first emission. A photoluminescent portion is disposed proximate the light source and is configured to convert at least a portion of the first emission to a second emission. The controller is configured to control the first emission at a first intensity to output the second emission in a dome light configuration corresponding to a first color and control the first emission at a second intensity to output the second emission in a reading light configuration corresponding to a second color.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting device for a vehicle configured to illuminate at least a portion of a passenger compartment. The lighting system may be configured to operate in at least a first state and a second state. The first state may correspond to a dome light function configured to emit light from the lighting device that is substantially white having a warm hue. The second state may correspond to a reading light function configured to emit light from the lighting device that is substantially white having a cool blue hue. The emitted light corresponding to the second state may have an increased intensity relative to the emitted light in the first state. In this way, the lighting device may be configured to illuminate the passenger compartment of a vehicle in a hue of white light that is best suited to a particular activity of an occupant.

Figure 1:
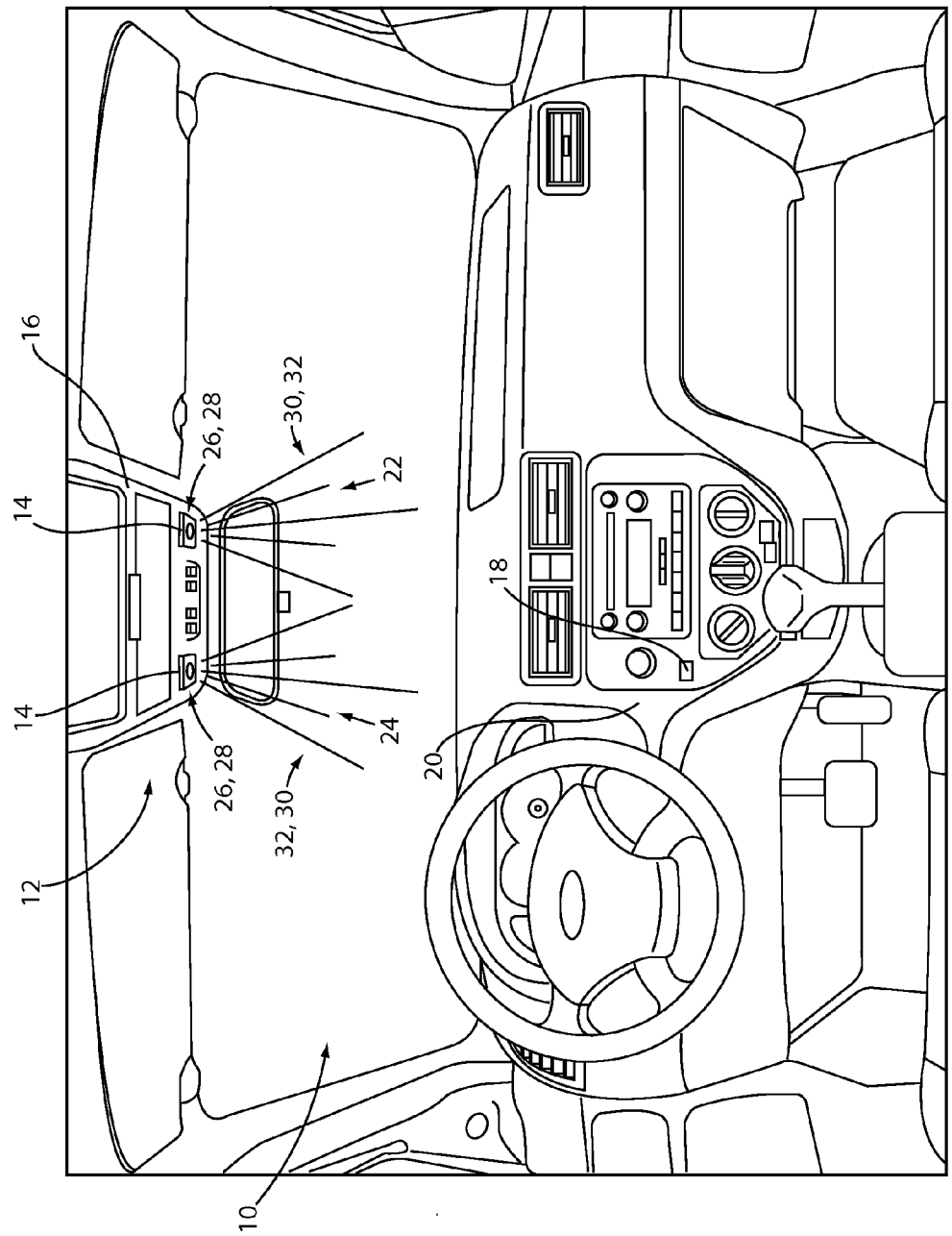
FIG. 1 is a schematic diagram illustrating a front passenger compartment of a vehicle having an overhead console employing at least one lighting device.

Referring to FIG. 1, the passenger compartment 10 of a vehicle 12 is generally illustrated having at least one lighting device 14 assembled in an overhead console 16. In the illustrated implementation, the overhead console 16 is assembled to an interior side of a headliner of the passenger compartment 10 and positioned in a central location in the passenger compartment 10. As exemplarily shown, two lighting devices 14 are assembled to the overhead console 16, one positioned to provide greater access to a driver of the vehicle 12 and the other positioned to provide greater access to an occupant of the vehicle 12. While two lighting devices 14 have been generally shown in FIG. 1, it should be appreciated that one or more lighting devices 14 may be incorporated in other locations of the overhead console 16 or other locations on board the vehicle 12.

One or more switches 18 may be configured to allow a vehicle occupant to manually activate the lighting devices 14. As exemplarily shown, a switch 18 is located proximate each of the lighting devices 14 to allow each lighting device 14 to be independently controlled. Additionally or alternatively, one or more switches 18 may be located elsewhere on board the vehicle 12, such as the vehicle dash 20. It should be appreciated that the switch 18 may be located in other locations inside the vehicle 12 such as, but not limited to, a driver side door, a passenger side door, and/or a center console area. In some implementations, a lighting controller of the vehicle 12 may also be configured to selectively activate the lighting devices 14. In this configuration, the lighting controller and/or an occupant of the vehicle 12 may be operable to activate each of the lighting devices 14 in a first state 22 which may correspond to a dome light function and a second state 24 which may correspond to a reading light function.

In some implementations, the lighting device 14 may comprise a photoluminescent portion 26 disposed along a path of a first emission 28. The first emission 28 may be output from a light source disposed in the lighting device 14. In some implementations, the photoluminescent portion 26 may be disposed in and/or on an optic device configured to transmit the first emission 28. The lighting device 14 may be configured to transmit the first emission 28 through the photoluminescent portion 26 such that the first emission 28 is converted to a second emission 30. The first emission 28 may correspond to a first wavelength of light and the second emission 30 may correspond to at least a second wavelength of light. The second wavelength of light may comprise at least one wavelength longer than the first wavelength of light. Once the first emission 28 is converted, the second emission 30 may be output as emitted light 32 from the lighting device 14 to illuminate at least a portion of the passenger compartment 10.

In some implementations, the lighting device 14 may be operable to selectively output the emitted light 32 in the first state 22 or the second state 24 in response to a control signal received from the lighting controller and/or the one or more switches 18. In the first state 22, the light source of the lighting device 14 may be configured to emit the first emission 28 at a first intensity. In the second state 24, the light source of the lighting device 14 may be configured to emit the first emission 28 at a second intensity, greater than the first intensity. As further described throughout this disclosure, the lighting device 14 may be operable to control the intensity of the first emission 28 output from the light source to control a color of the emitted light 32.

Figure 2A:
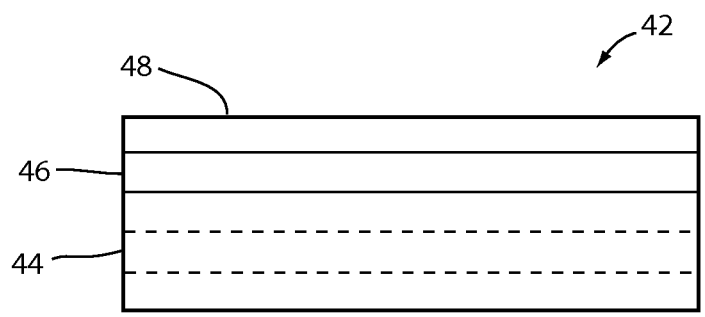
FIG. 2A illustrates a photoluminescent structure rendered as a coating.
Figure 2B:
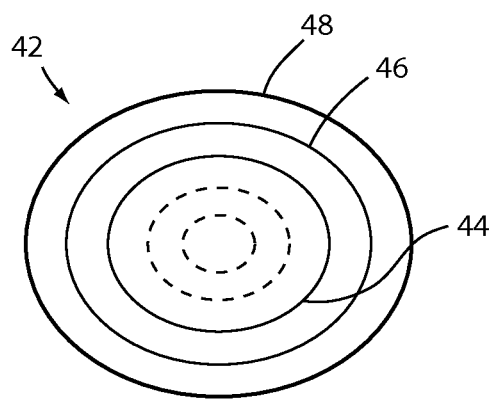
FIG. 2B illustrates the photoluminescent structure rendered as a discrete particle.
Figure 2C:
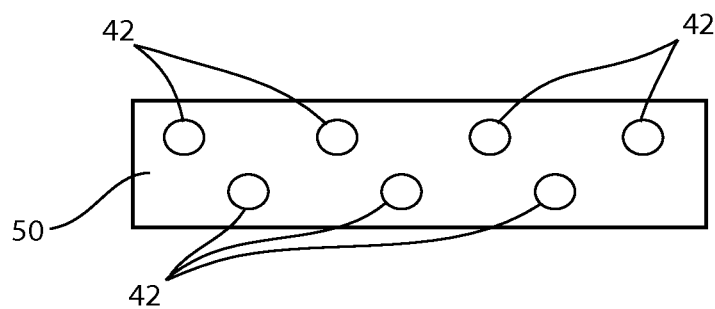
FIG. 2C illustrates a plurality of photoluminescent structures rendered as discrete particles and incorporated into a separate structure.

Referring to FIGS. 2A-2C, a photoluminescent structure 42 is generally shown rendered as a coating (e.g. a film) capable of being applied to an optic device, a discrete particle capable of being implanted in an optic device, and a plurality of discrete particles incorporated into a separate structure capable of being applied to the optic device, respectively. The photoluminescent structure 42 may correspond to the photoluminescent portion 26 as discussed herein. At the most basic level, the photoluminescent structure 42 includes an energy conversion layer 44 that may be provided as a single layer or a multilayer structure, as shown through broken lines in FIGS. 2A and 2B.

The energy conversion layer 44 may include one or more photoluminescent materials having energy converting elements selected from a phosphorescent or a fluorescent material. The photoluminescent materials may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various implementations discussed herein, each of the wavelengths of light (e.g. the first wavelength, etc.) correspond to electromagnetic radiation, which may be utilized in the conversion process.

The photoluminescent portion 26 may comprise at least one photoluminescent structure 42 comprising an energy conversion layer (e.g. conversion layer 44). The energy conversion layer 44 may be prepared by dispersing the photoluminescent material in a polymer matrix 50 to form a homogenous mixture using a variety of methods. Such methods may include preparing the energy conversion layer 44 from a formulation in a liquid carrier medium and coating the energy conversion layer 44 to a desired planar and/or non-planar substrate, for example a surface of an optic device. The energy conversion layer 44 may be deposited on an optic device by painting, screen printing, spraying, slot coating, dip coating, roller coating, and bar coating. Additionally, the energy conversion layer 44 may be prepared by methods that do not use a liquid carrier medium.

For example, a solid state solution (homogenous mixture in a dry state) of one or more photoluminescent materials may be incorporated in a polymer matrix 50 to provide the energy conversion layer 44. The polymer matrix 50 may be formed by extrusion, injection molding, compression molding, calendaring, thermoforming, etc. In instances where one or more energy conversion layers 44 are rendered as particles, the single or multilayered energy conversion layers 44 may be implanted into an optic device or a portion of the lighting device 14 configured to be at least partially light transmissive. When the energy conversion layer 44 includes a multilayer formulation, each layer may be sequentially coated. Additionally, the layers can be separately prepared and later laminated or embossed together to form an integral layer. The layers may also be coextruded to prepare an integrated multilayered energy conversion structure.

Referring back to FIGS. 2A and 2B, the photoluminescent structure 42 may optionally include at least one stability layer 46 to protect the photoluminescent material contained within the energy conversion layer 44 from photolytic and thermal degradation. The stability layer 46 may be configured as a separate layer optically coupled and adhered to the energy conversion layer 44. The stability layer 46 may also be integrated with the energy conversion layer 44. The photoluminescent structure 42 may also optionally include a protection layer 48 optically coupled and adhered to the stability layer 46 or any layer or coating to protect the photoluminescent structure 42 from physical and chemical damage arising from environmental exposure.

The stability layer 46 and/or the protective layer 48 may be combined with the energy conversion layer 44 to form an integrated photoluminescent structure 42 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 42. Once formed, the photoluminescent structure 42 may be applied to a portion of the lighting device 14 configured to convert at least a portion of the first emission to the second emission 30. In some implementations, the photoluminescent structure 42 may be applied to/disposed in an optic device to form the photoluminescent portion 26.

In some implementations, the photoluminescent structure 42 may be incorporated into an optic device as one or more discrete multilayered particles as shown in FIG. 2C. The photoluminescent structure 42 may also be provided as one or more discrete multilayered particles dispersed in a polymer matrix 50 that is subsequently applied to an optic device or portion of the lighting device 14 as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

Figure 3:
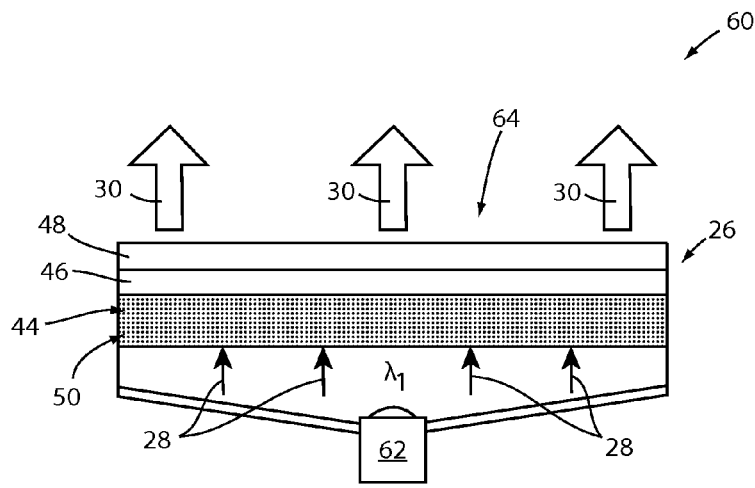
FIG. 3 is schematic view of a back-lit configuration of a lighting apparatus configured to convert a first wavelength of light to at least a second wavelength.

Referring to FIG. 3, the lighting device 14 is generally shown according to a back-lit configuration 60. In this configuration, the first emission 28 emitted from the light source 62 is converted to a second emission 30 by the energy conversion layer 44. The first emission 28 comprises a first wavelength, and the second emission 30 comprises a second wavelength. The lighting device 14 comprises the photoluminescent structure 42 disposed on or in the photoluminescent portion 26. The photoluminescent structure 42 may be rendered as a coating and applied to the optic device 64, for example an at least partially light transmissive portion of the lighting device 14. The photoluminescent material may also be dispersed as a polymer matrix 50 corresponding to the energy conversion layer 44.

In some implementations, the energy conversion layer 44 may further include the stability layer 46 and/or protective layer 48. In response to the light source 62 being activated, the first emission 28 may be received by the energy conversion layer 44 and converted from the first emission 28 having the first wavelength to the second emission 30 having at least the second wavelength. The second emission 30 may comprise a plurality of wavelengths configured to emit any color of light from the photoluminescent portion 26.

In various implementations, the lighting device 14 comprises at least one photoluminescent material incorporated in the polymer matrix 50 and/or energy conversion layer 44 and is configured to convert the first emission 28 at the first wavelength to the second emission 30 having at least the second wavelength. In order to generate the plurality of wavelengths, the energy conversion layer 44 may comprise one or more photoluminescent materials configured to emit the second emission 30 as wavelengths of light in the red, green, and/or blue color spectrums. Such photoluminescent materials may further be combined to generate a wide variety of colors of light for the second emission 30. For example, the red, green, and blue-emitting photoluminescent materials may be utilized in a variety of proportions and combinations to control the output color of the second emission 30.

Each of the photoluminescent materials may vary in output intensity, output wavelength, and peak absorption wavelengths based on a particular photochemical structure and combinations of photochemical structures utilized in the energy conversion layer 44. As an example, the second emission 30 may be changed by adjusting the wavelength of the first emission 28 to activate the photoluminescent materials at different intensities to alter the color of the second emission 30. In addition to, or alternatively to the red, green, and blue-emitting photoluminescent materials, other photoluminescent materials may be utilized alone and in various combinations to generate the second emission 30 in a wide variety of colors. In this way, the lighting device 14 may be configured for a variety of applications to provide a desired lighting color and effect for a vehicle.

To achieve the various colors and combinations of photoluminescent materials described herein, the lighting device 14 may utilize any form of photoluminescent materials, for example phospholuminescent materials, organic and inorganic dyes, etc. For additional information regarding fabrication and utilization of photoluminescent materials to achieve various emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Pat. No. 9,057,021 to Kingsley et al., entitled "PHOTOLUMINESCENT OBJECTS," filed Oct. 23, 2012; and U.S. Pat. No. 9,493,699 to Agrawal et al., entitled "CHROMIC LUMINESCENT COMPOSITIONS AND TEXTILES," filed Dec. 19, 2013, all of which are incorporated herein by reference in their entirety.

The light source 62 may also be referred to as an excitation source and is operable to emit at least the first emission 28. The light source 62 may comprise any form of light source, for example halogen lighting, fluorescent lighting, light emitting diodes (LEDs), organic LEDs (OLEDs), polymer LEDs (PLEDs), solid state lighting or any other form of lighting configured to output the first emission 28. The first emission 28 from the light source 62 may be configured such that the first wavelength corresponds to at least one absorption wavelength of the one or more photoluminescent materials of the energy conversion layer 44 and/or polymer matrix 50. In response to receiving the light at the first wavelength, the energy conversion layer 44 may be excited and output the one or more output wavelengths, for example, the second emission 30 having the second wavelength $\lambda_2$. The first emission 28 may provide an excitation source for the energy conversion layer 44 by targeting absorption wavelengths of a particular photoluminescent material or combination thereof utilized therein. As such, the lighting device 14 may be configured to output the second emission 30 to generate a desired light intensity and color.

In an exemplary implementation, the light source 62 comprises an LED configured to emit the first wavelength which may correspond to a blue spectral, violet, and/or ultra-violet color range. The blue spectral color range comprises a range of wavelengths generally expressed as blue light (~440-500 nm). In some implementations, the first wavelength may comprise a wavelength in the ultraviolet or near ultraviolet color range (~100-450 nm). In an exemplary implementation, the first wavelength may be approximately equal to 470 nm. Though particular wavelengths and ranges of wavelengths are discussed in reference to the first wavelength, the first wavelength may generally be configured to excite any photoluminescent material.

In an exemplary implementation, the first wavelength may be approximately less than 500 nm. The blue spectral color range and shorter wavelengths may be utilized as an excitation source for the lighting device 14 due to these wavelengths having limited perceptual acuity in the visible spectrum of the human eye. By utilizing shorter wavelengths for the first wavelength $\lambda_1$, and converting the first wavelength with the conversion layer 44 to at least one longer wavelength, the lighting device 14 creates a visual effect of light originating from the photoluminescent structure 42.

As discussed herein, each of the plurality of wavelengths corresponding to the second emission 30 may correspond to a significantly different spectral color range. The second wavelength may correspond to a plurality of wavelengths configured appear as substantially white light. The plurality of wavelengths may be generated by a red-emitting photoluminescent material having a wavelength of approximately 620-750 nm, a green emitting photoluminescent material having a wavelength of approximately 526-606 nm, and a blue or blue green emitting photoluminescent material having a wavelength longer than the first wavelength and approximately 430-525 nm in one embodiment. The plurality of wavelengths may be utilized to generate a wide variety of colors of light from the photoluminescent portion 26 converted from the first wavelength.

Figure 4:
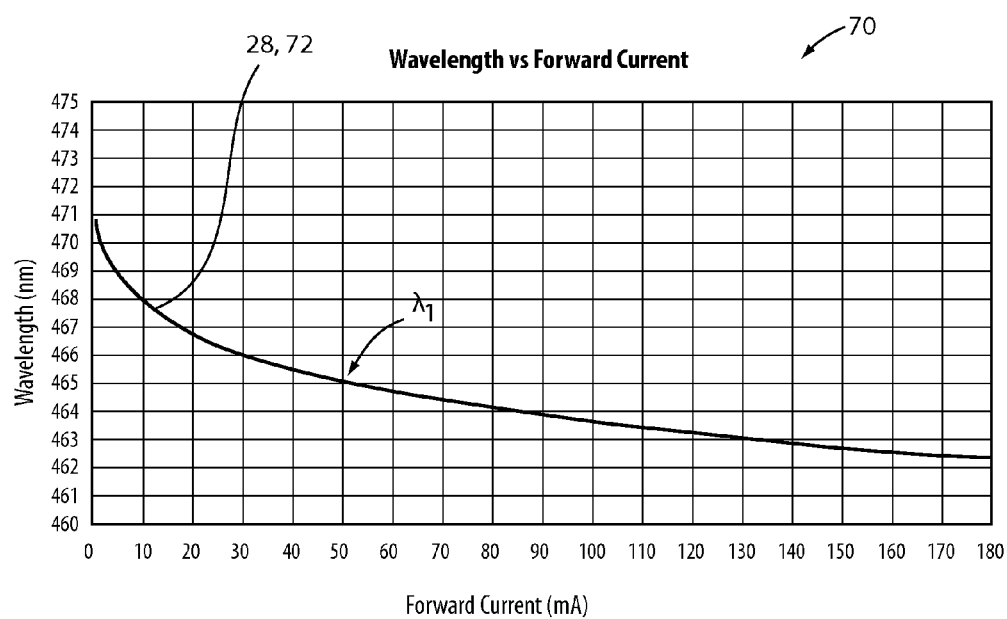
FIG. 4 is a graphical depiction of an emission from a light source.
Figure 5:
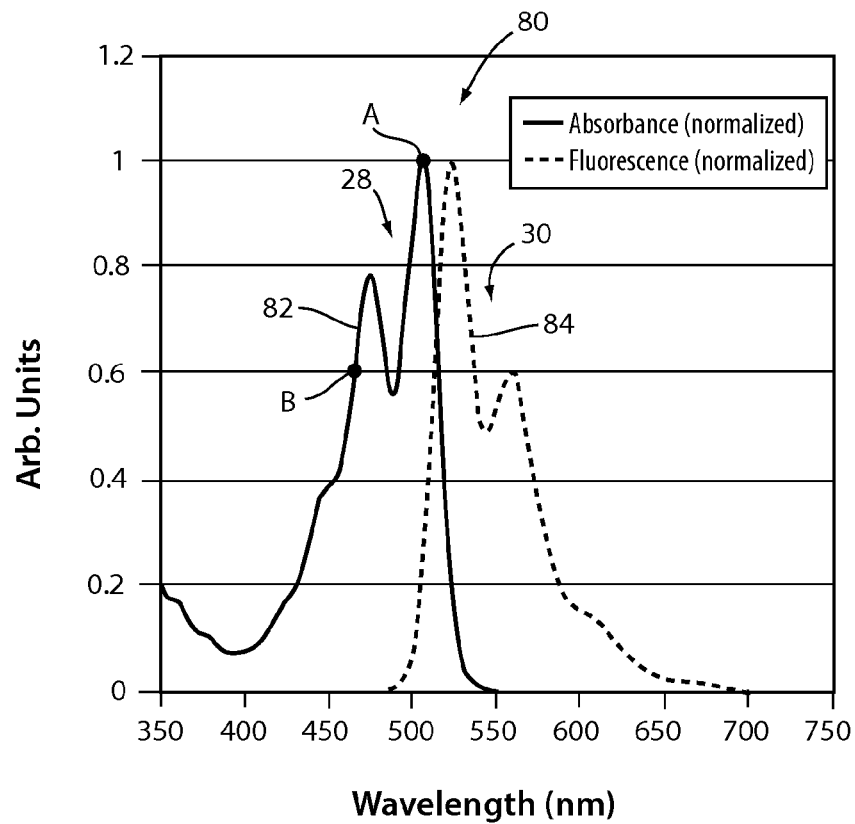
FIG. 5 is a graphical depiction of an absorbance and a fluorescence of a photoluminescent material.

FIG. 4 is a graphical depiction 70 of an example emission 72 of light corresponding to the first emission 28 is shown demonstrating a wavelength relative to a forward current supplied to the light source 62. FIG. 5 is a graphical depiction 80 of an absorbance of an input wavelength 82 of light (e.g. the first emission 28) relative to a fluorescence of an output wavelength 84 (e.g. the second emission 30) of an exemplary photoluminescent portion. Referring to FIGS. 4 and 5, the lighting device 14 may be operable to adjust the first wavelength of the first emission 28 by adjusting the current supplied to the light source 62. For example, at a 100% duty cycle, as the forward current supplied to the first light source 62 increases from 20 mA to 170 mA, the first wavelength of the first emission 28 changes from approximately 468 nm to 462.5 nm. By adjusting the forward current supplied to the first light source 62, the lighting device 14 may be operable to selectively adjust the first wavelength corresponding to the first emission 28.

In some implementations, the first wavelength of the first emission 28 may be adjusted by utilizing a different type of light source and/or by adjusting the duty cycle of the light source 62. For example, as shown in FIG. 4, the operating forward current range of the light source 62 may vary from approximately 1 mA to 180 mA at a 100% duty cycle. However, the operating forward current range of the light source 62 may vary from approximately 1 mA to 350 mA at a 10% duty cycle. Corresponding to the increased range in the forward current range at the 10% duty cycle, the first wavelength may vary from approximately 468 nm to 450 nm. In some implementations, the first wavelength may vary from approximately 468 nm to 462 nm. In an exemplary implementation, the first wavelength may vary by 1% to approximately 3% in response to adjusting the forward driving current and duty cycle of the first light source 62. Though particular ranges and values corresponding to the first wavelength, driving current, and duty cycle are discussed herein, the particular ranges and values may vary based on the particular type of light source, for example different blue LEDs.

By adjusting the first wavelength of the first emission 28, the lighting device 14 may be operable to adjust first emission 28 such that the first wavelength corresponds to a different absorbance level of an input wavelength 82 of the photoluminescent portion 26. Corresponding to the example discussed in reference to FIG. 4, the first wavelength may be adjusted from approximately 468 nm to 460 nm. As shown in FIG. 5, the absorbance level of the photoluminescent portion 26 may change from approximately 0.78 at 468 nm at point A to 0.6 at 460 nm at point B. As such, the photoluminescent portion 26 may absorb less of the first emission 28 at when the first wavelength is approximately 468 nm than when the first wavelength is approximately 460 nm. By adjusting the first wavelength, the conversion capacity of the photoluminescent portion 26 may be adjusted such that the color of the emitted light 32 changes.

The conversion capacity of the photoluminescent portion may correspond to a quantity or rate at which the photoluminescent portion 26 may be operable to convert light energy from the first emission 28 to the second emission 30. By controlling the first wavelength, the conversion capacity of the photoluminescent portion 26 may be adjusted such that the lighting device 14 may be operable to adjust the color of the emitted light 32 by adjusting the forward current supplied to the light source 62. In this configuration, the lighting device 14 may be operable to blend the colors of the first emission 28 and the second emission 30. In this way, the lighting device 14 may be configured to control the first emission 28 at a first intensity to output the second emission 30 in a dome light configuration corresponding to a first color and control the first emission 28 at a second intensity to output the second emission 30 in a reading light configuration corresponding to a second color.

A first state as discussed herein may correspond to dome light function of the lighting device 14 and the second state may correspond to a reading light function. The first state may be activated by a lighting controller of the vehicle 12 in response to a plurality of vehicle states. For example, the first state may be activated by the lighting controller in response to a door of the vehicle 12 being ajar, and various times corresponding to periods of entrance into and departure from the vehicle 12. The second state may be selectively activated by the lighting device in response to an input from the one or more switches 18. As such, the lighting device 14 may provide for utility and accent lighting to illuminate vehicle 12.

Figure 6:
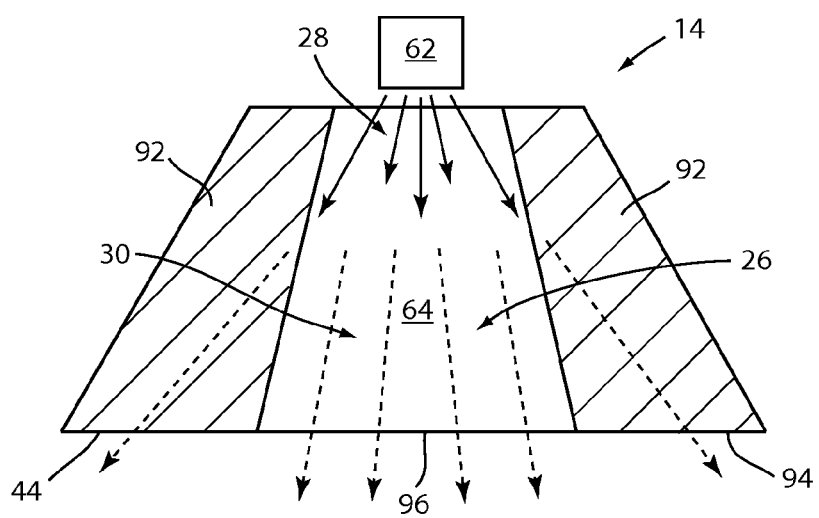
FIG. 6 is a schematic diagram illustrating an implementation of a lighting device.

Referring now to FIG. 6, a diagram of the lighting device 14 is shown according to one implementation. To disperse the light emitted from the light source 62, a diffusing optic 92 may be disposed proximate the light source 62. The diffusing optic 92 may form a cavity configured to receive the first emission 28. The diffusing optic 92 may correspond to a first shot of a molded polymeric material forming an outer edge of the optic device 64. The optic device 64 may correspond to a second shot of molded polymeric material.

The optic device 64 may be configured to receive the first emission 28. The material of the optic device 64 may comprise the photoluminescent material of the photoluminescent portion 26 disposed therein. As the first emission 28 is transmitted through the photoluminescent portion 26, the first emission 28 may be converted to the second emission 30. A portion of the second emission 30 may further be transmitted from the optic device 64 into the diffusing optic 92. In this configuration, the diffusing optic 92 may be configured to emit an ambient glowing light along an exterior surface 94 of the lighting device 14 and the optic device 64 may be operable to emit directional light from a light projecting surface 96 of the lighting device 14. Each of the ambient glowing light and the directional light may correspond to the emitted light 32.

Figure 7:
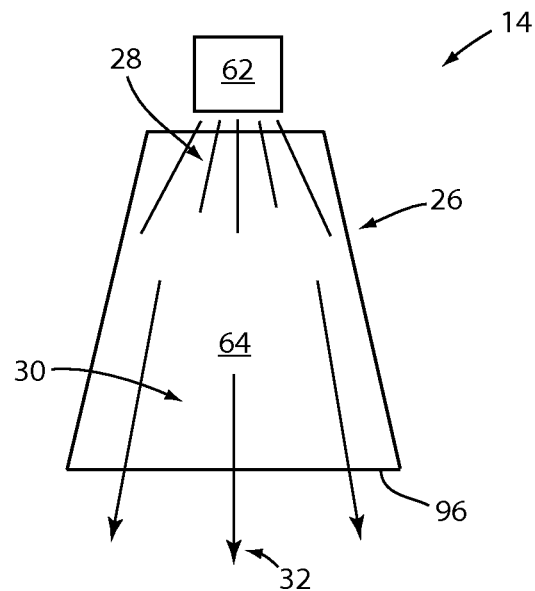
FIG. 7 is a schematic diagram illustrating an implementation of a lighting device.

Referring now to FIG. 7, in some implementations, the lighting device 14 may comprise a reflective coating 102, for example a metallic coating, disposed on an outer surface of the optic device 64. In this configuration, the first emission 28 may be converted to the second emission 30 due to the excitation of the photoluminescent material of the photoluminescent portion 26. Additionally, the first emission 28 and the second emission 30 may be reflected into the optic device 64 by the reflective coating to ensure that the emitted light 32 is directed outward through the projecting surface 96. In this configuration, the lighting device 14 may be configured output substantially all of the emitted light 32 through the projecting surface 96 to provide an enhanced projection of the emitted light 32.

Figure 8:
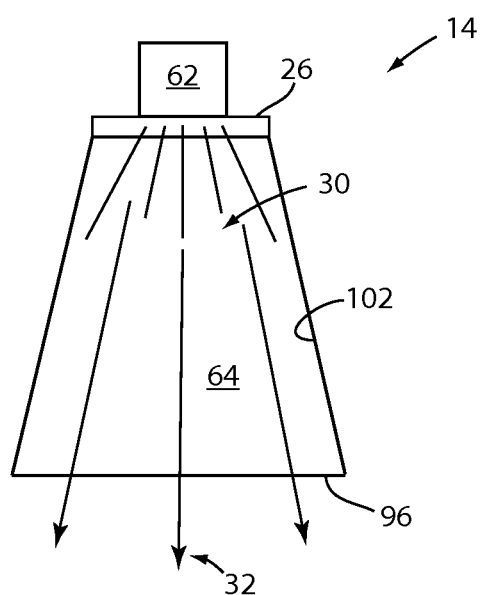
FIG. 8 is a schematic diagram illustrating implementations of a lighting device in accordance with the disclosure.

Referring now to FIG. 8, in some implementations, the photoluminescent portion 26 may be disposed in a light converting optic device 112. The light converting optic device 112 may correspond to a lens or at least partially light transmissive portion disposed proximate the light source 62. The light converting optic device 112 may comprise the photoluminescent material of the photoluminescent portion 26. In this configuration, the first emission 28 may be output from the light source 62 and into the light converting optic device 112. In response to receiving the first emission 28, the photoluminescent material may be configured to convert at least a portion of the first emission 28 to the second emission 30. The second emission 30 and a portion of the first emission 28 may then be transmitted from the light converting optic device 112 the optic device 64. In this configuration, the optic device 64 may correspond to a clear polymeric material configured to transmit the second emission 30 and the portion of the first emission 28 therethrough. The second emission 30 and the portion of the first emission 28 may then be output as the emitted light 32 from the light projecting surface 96.

The disclosure provides for a lighting device for a vehicle configured to illuminate at least a portion of a passenger compartment. The lighting system may be configured to operate in at least a first state and a second state. The first state may correspond to a dome light function configured to emit light from the lighting device that is substantially white having a warm hue. The second state may correspond to a reading light function configured to emit light from the lighting device that is substantially white having a cool hue. The light corresponding to the second state may also have an increased intensity relative to the emitted light in the first state. In this way, the lighting device may be configured to illuminate the passenger compartment of a vehicle in a hue of white light that is best suited to a particular activity of an occupant.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A lighting device for a vehicle comprising:
   a single color light source configured to emit a first emission in a first color in a blue spectral range and in communication with a controller, the first color configured to excite a photoluminescent portion to emit a white colored light, wherein the controller is operable to adjust an output color of a second emission output from the photoluminescent portion by adjusting a forward driving current and a duty cycle of the single color light source, such that an intensity of the first emission exceeds a conversion capacity of the photoluminescent portion.

2. The lighting device according to claim 1, wherein the white colored light is adjusted to include an increasing percentage of the first color in response to an increase in the intensity of the first emission.

3. The lighting device according to claim 2, wherein the increasing percentage of the first color corresponds to a higher percentage of a blue hue in the output color.

4. The lighting device according to claim 2, wherein the output color changes from a warm white light to a cool white light in response to increasing the intensity of the first emission.

5. The lighting device according to claim 1, wherein the controller is further operable to increase a percentage of blue light in the output color by increasing the intensity of the light output.

6. The lighting device according to claim 1, wherein the controller is further operable to adjust the intensity of the first emission in response to an input from one or more switches in communication with the controller, and in response to the change in the intensity, the output emission changes from a warm white light to a cool blue white light.

7. A lighting device for a vehicle comprising:
   a single color light source configured to emit a first emission in a blue color;
   an optic device comprising a photoluminescent portion configured to convert at least a portion of the first emission to a second emission in a substantially white color;
   a diffusing optic comprising an annular ring disposed around a perimeter of the optic device; and
   a controller configured to adjust a color of the second emission by selectively adjusting an intensity of the first emission.

8. The lighting device according to claim 7, wherein the first emission and the second emission are blended to generate an output color comprising a first color in a first state and a second color in a second state.

9. The lighting device according to claim 8, wherein the first emission in the first state corresponds to a lower intensity of light than the first emission in the second state.

10. The lighting device according to claim 8, wherein the second color comprises a higher percentage of a blue hue than the first color.

11. The lighting device according to claim 8, wherein the lighting device is configured to emit the output color as a warm white light in the first state and a cool white light in the second state.

12. The lighting device according to claim 8, wherein the photoluminescent portion corresponds to a photoluminescent material disposed in an optic device substantially aligned with the light source.

13. The lighting device according to claim 12, further comprising:
a diffusing optic disposed around an outer edge of the optic device, wherein the optic device is configured to transmit the second emission into the diffusing optic.

14. The lighting device according to claim 13, wherein the diffusing optic is configured to emit the second emission as an ambient glowing light along an exterior surface of the lighting device and the optic device is configured to emit the second emission from a light projecting surface of the lighting device.

15. The lighting device according to claim 7, wherein adjusting the color of the second emission is a result of the intensity of the first emission exceeding a conversion capacity of the photoluminescent portion.

16. A lighting device for a vehicle, comprising:
a light source in communication with a controller and configured to emit a first emission;
an optic device comprising a photoluminescent portion configured to convert at least a portion of the first emission to a second emission; and
an annular diffusing optic disposed around the optic device, wherein the optic device is configured to transmit the second emission into the diffusing optic, wherein the controller is configured to:
control the first emission at a first intensity to output the second emission in a dome light configuration corresponding to a first color; and
control the first emission at a second intensity to output the second emission in a reading light configuration corresponding to a second color, wherein the change from the first color to the second color is in response to the second intensity exceeding a conversion capacity of the photoluminescent portion.

17. The lighting device according to claim 16, wherein the first emission is emitted at a first intensity corresponding to the dome light configuration and at a second intensity corresponding to the reading light configuration.

18. The lighting apparatus according to claim 17, wherein the second intensity is greater than the first intensity.

19. The lighting device according to claim 16, wherein the second color comprises a higher percentage of a blue hue than the first color.

* * * * *